United States Patent
Tamano

(10) Patent No.: US 10,317,659 B2
(45) Date of Patent: Jun. 11, 2019

(54) LASER MICROSCOPE

(71) Applicant: OLYMPUS CORPORATION, Hachioji-shi, Tokyo (JP)

(72) Inventor: Shingo Tamano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/613,101

(22) Filed: Jun. 2, 2017

(65) Prior Publication Data
US 2017/0351077 A1  Dec. 7, 2017

(30) Foreign Application Priority Data

Jun. 7, 2016  (JP) ................... 2016-113464

(51) Int. Cl.
| | |
|---|---|
| *G02B 21/06* | (2006.01) |
| *G02B 21/16* | (2006.01) |
| *G02B 5/20* | (2006.01) |
| *G02B 21/00* | (2006.01) |

(52) U.S. Cl.
CPC ............ *G02B 21/16* (2013.01); *G02B 5/201* (2013.01); *G02B 21/0032* (2013.01); *G02B 21/0052* (2013.01); *G02B 21/0076* (2013.01)

(58) Field of Classification Search
CPC ............ G02B 21/0076; G02B 21/0064; G02B 21/008; G02B 21/0032; G02B 21/06; G01N 21/6458; G01J 3/14

See application file for complete search history.

(56) References Cited

U.S. PATENT DOCUMENTS

| | | | | |
|---|---|---|---|---|
| 6,614,525 B1* | 9/2003 | Engelhardt | ........ | G02B 21/0032 250/458.1 |
| 6,809,815 B2* | 10/2004 | Knebel | ........ | G01J 3/14 356/308 |
| 7,365,842 B2* | 4/2008 | Kitagawa | ........ | G01N 21/6458 356/317 |
| 2005/0211872 A1* | 9/2005 | Kawano | ........ | G02B 21/004 250/201.3 |
| 2005/0253088 A1 | 11/2005 | Hattori et al. | | |
| 2010/0091287 A1* | 4/2010 | Power | ........ | G02B 21/0032 356/417 |

(Continued)

FOREIGN PATENT DOCUMENTS

JP  2005326351 A  11/2005

*Primary Examiner* — William R Alexander
*Assistant Examiner* — Balram T Parbadia
(74) *Attorney, Agent, or Firm* — Holtz, Holtz & Volek PC

(57) ABSTRACT

A laser microscope 1 includes: a filter unit 18, which is a fluorescence-splitting mechanism that splits the fluorescence generated by the specimen S and the excitation light according to a wavelength, and that changes a wavelength at which light is split; a diffraction grating 22 that disperses the fluorescence split by the filter unit 18; a mirror 23 that changes a wavelength of fluorescence that is detected by a PMT 26 and that is dispersed by the diffraction grating 22; and a control unit 30 that controls the filter unit 18. The control unit 30 performs control to change a wavelength at which the filter unit 18 splits light in accordance with a change in the wavelength of the fluorescence that is detected by the PMT 26 and that is dispersed by the diffraction grating 22, the change being performed by the mirror 23.

9 Claims, 18 Drawing Sheets

(56) References Cited

U.S. PATENT DOCUMENTS

2010/0294949 A1* 11/2010 Sasaki ............... G02B 21/0076
  250/458.1
2012/0032069 A1*  2/2012 Miyazono .......... G02B 21/0064
  250/234

* cited by examiner

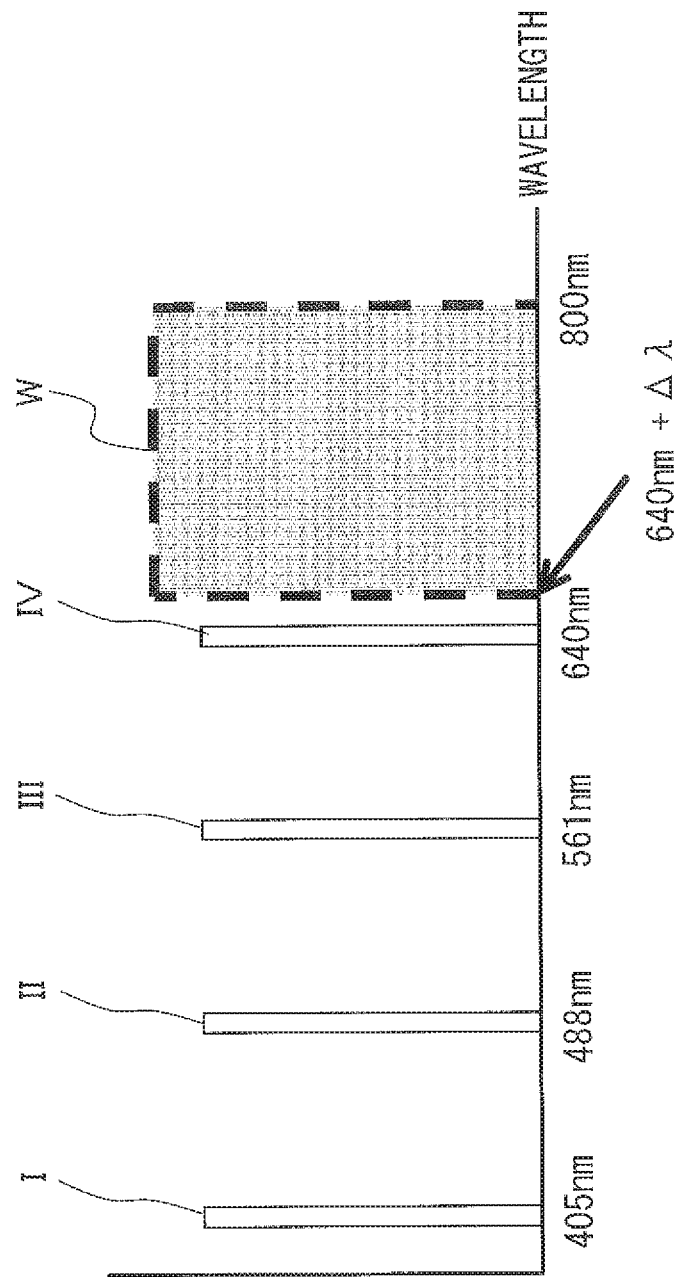
F I G. 5

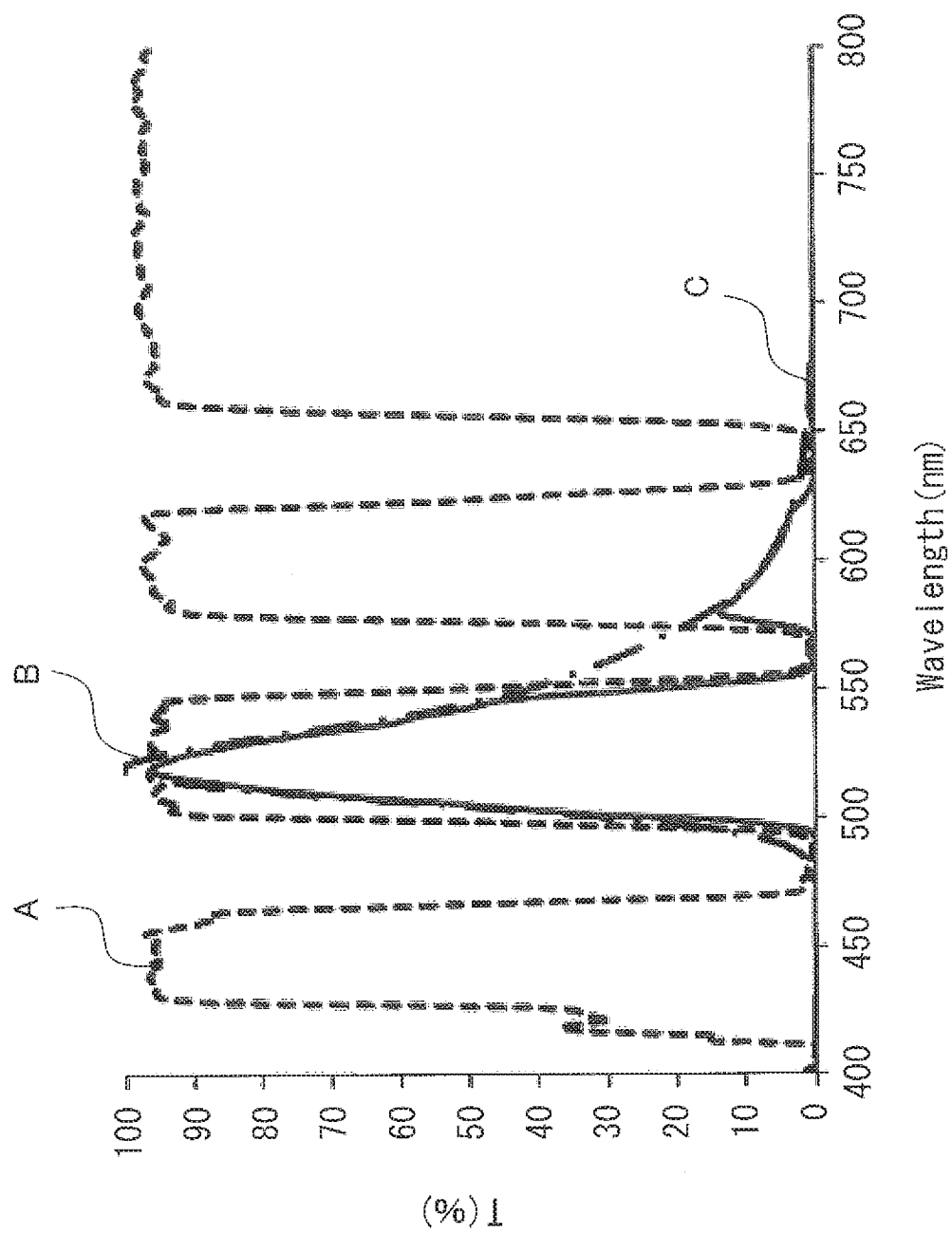
F I G. 6

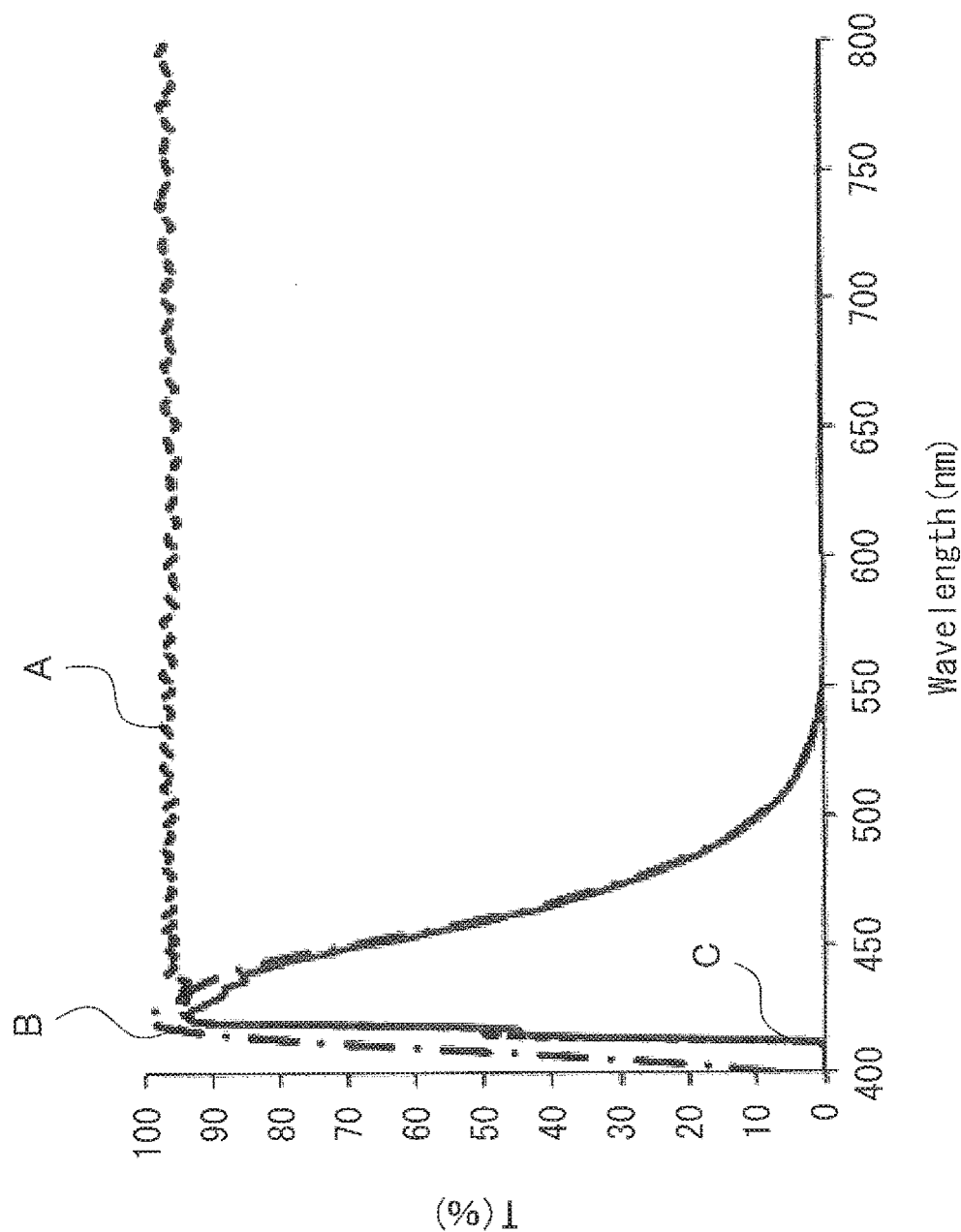
F I G. 7

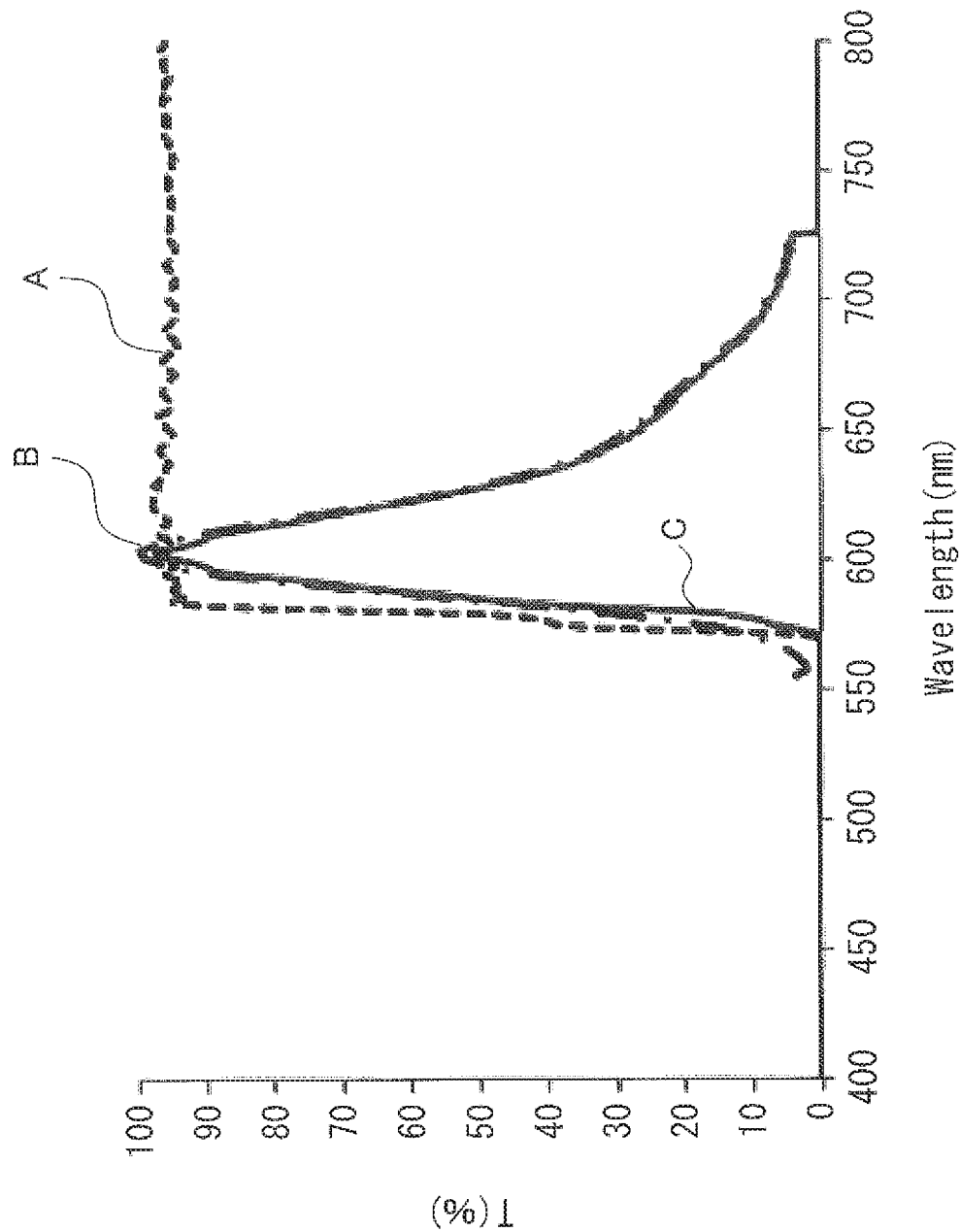
F I G. 9

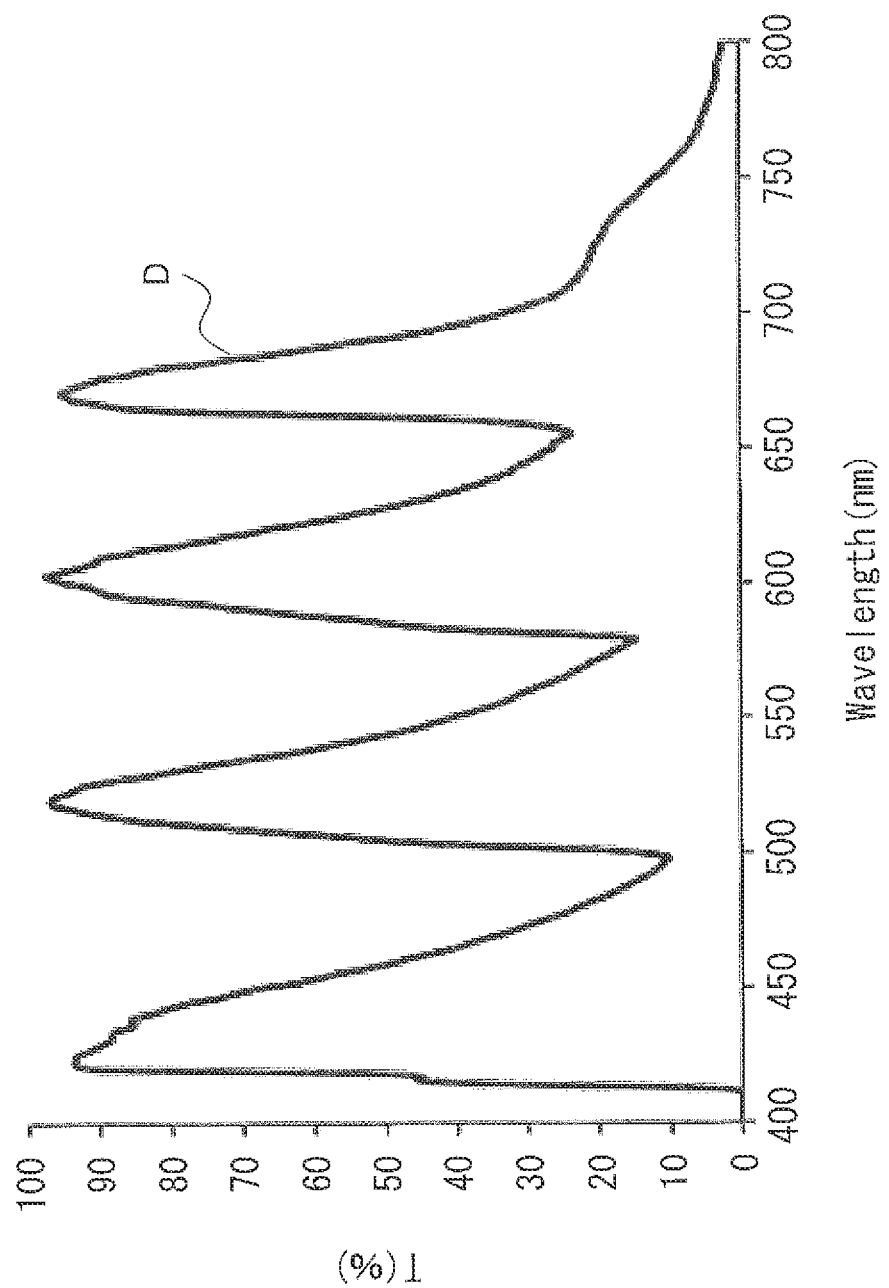
F I G. 12

LASER MICROSCOPE

CROSS REFERENCE TO RELATED APPLICATIONS

This application is based upon and claims the benefit of priority from the prior Japanese Patent Application No. 2016-113464, filed Jun. 7, 2016, the entire contents of which are incorporated herein by this reference.

BACKGROUND OF THE INVENTION

Field of the Invention

The present invention relates to a laser microscope that disperses and detects fluorescence generated by a specimen.

Description of the Related Art

Conventionally, as a method for obtaining an optical spectrum of fluorescence by using a laser microscope, a method is known in which an optical spectrum of fluorescence is obtained by dispersing fluorescence that is generated by irradiating a specimen with excitation light, and by further changing a wavelength at which the dispersed fluorescence is detected by a detector. Hereinafter, such a method is referred to as λ-scanning. λ-scanning is performed, for example, by changing a reflection angle of a mirror that forwards the dispersed fluorescence to the detector.

In addition, a specimen is multiple-dyed in advance by using plural different fluorochromes, and λ-scanning is performed while changing the wavelength of applied excitation light such that an optical spectrum of fluorescence that corresponds to the plural fluorochromes can be obtained by performing one λ-scanning. Such a technology is described, for example, in Japanese Laid-Open Patent Publication No. 2005-326351.

In a case in which λ-scanning is performed on a specimen that has been multiple-dyed by using a plurality of fluorochromes, as described above, plural types of excitation light having different wavelengths are applied according to the wavelength of fluorescence to be obtained. Accordingly, in a configuration in which excitation light and fluorescence are split, plural types of excitation light to be used need to be split from fluorescence. As a configuration in which plural types of excitation light are split, it is conceivable to use a multi-bandpass dichroic mirror (hereinafter also referred to as a DM) that transmits light in plural wavelength ranges.

SUMMARY OF THE INVENTION

A laser microscope in an aspect of the present invention is a laser microscope that disperses and detects fluorescence that is generated by a specimen by irradiating the specimen with excitation light. The laser microscope includes: a fluorescence-splitting mechanism that splits the fluorescence generated by the specimen and the excitation light according to a wavelength, and that changes a wavelength at which light is split; a spectroscopic mechanism that disperses the fluorescence split by the fluorescence-splitting mechanism; a detection wavelength changing mechanism that changes a wavelength of fluorescence that is detected by a detector and that is dispersed by the spectroscopic mechanism; and a control device that controls the fluorescence-splitting mechanism. The control device performs control to change a wavelength at which the fluorescence-splitting mechanism splits light in accordance with a change in the wavelength of the fluorescence that is detected by the detector and that is dispersed by the spectroscopic mechanism, the change being performed by the detection wavelength changing mechanism.

BRIEF DESCRIPTION OF THE DRAWINGS

The present invention will be more apparent from the following detailed description when the accompanying drawings are referenced.

FIG. 5 illustrates yet another state of light sources, and a remaining detection wavelength range in which a detector performs detection in the state.

FIG. 6 illustrates an example of an optical spectrum that is detected in a case in which a multi-bandpass DM is used as an optical filter.

FIG. 7 illustrates an optical spectrum of detected fluorescence in a state in which an optical filter is arranged.

FIG. 9 illustrates an optical spectrum of detected fluorescence in a state in which yet another optical filter is arranged.

FIG. 12 illustrates an optical spectrum of fluorescence detected according to the flowchart of FIG. 11.

DESCRIPTION OF THE EMBODIMENTS

Conventionally, there are the following problems when λ-scanning is performed by using plural types of excitation light. As an example, in a case in which a multi-bandpass DM is used, when an excitation wavelength range in which excitation light is split (a wavelength range that is removed from a detection light path by a DM) overlaps a fluorescent wavelength range in which detection is performed, a problem arises wherein an optical spectrum of fluorescence cannot be obtained in the overlapping wavelength range.

In addition, as an example, in a case in which a beam splitter is used as a configuration that detects fluorescence, excitation light reflected by a specimen enters a detector, and therefore a problem arises wherein much noise is generated and an accurate optical spectrum of fluorescence cannot be obtained.

In view of the foregoing, an object of the present invention is to provide an observation technology that enables an accurate optical spectrum of fluorescence to be obtained even when λ-scanning is performed by using plural types of excitation light.

Figure 1:
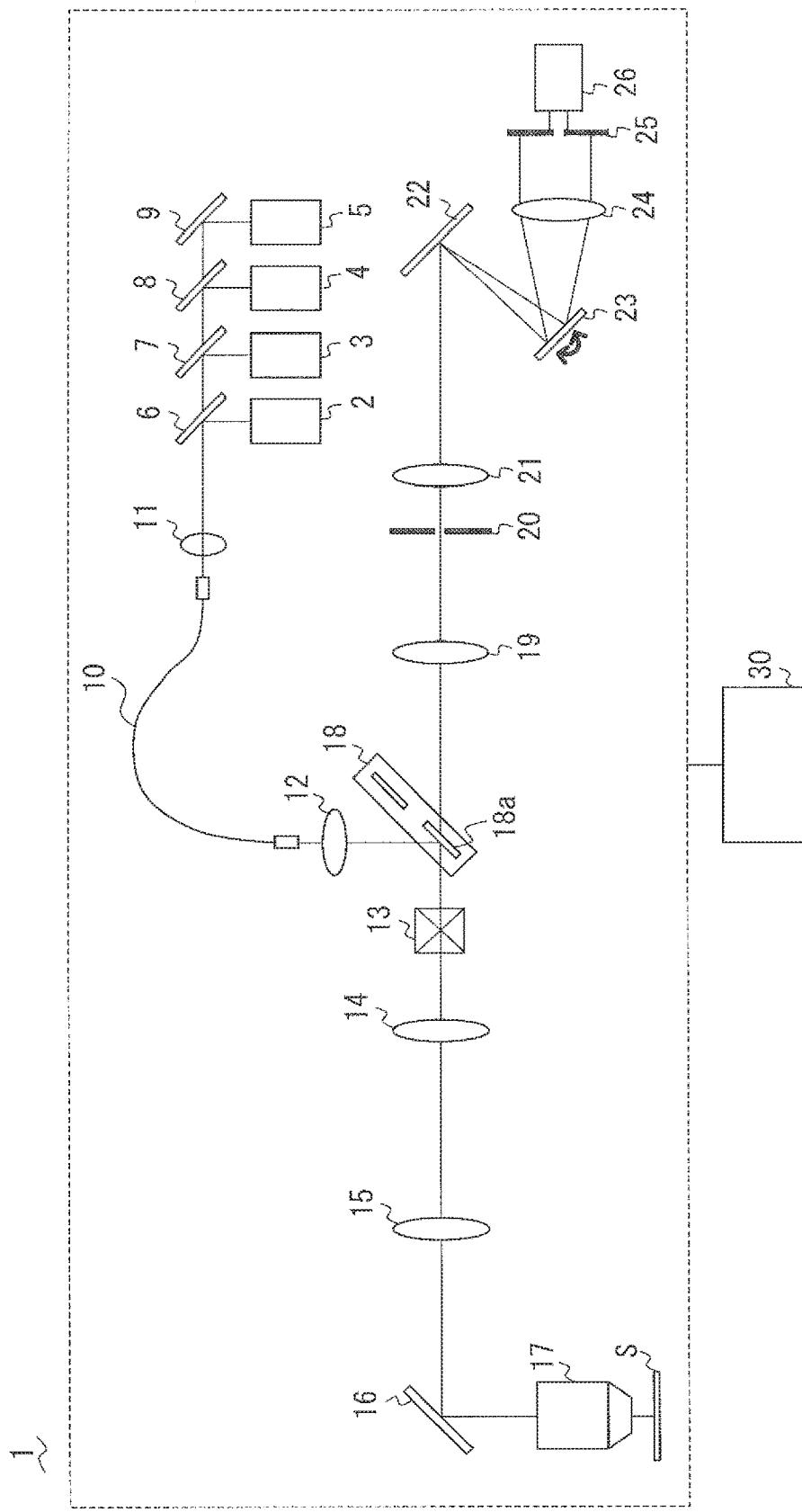
FIG. 1 illustrates the configuration of a laser microscope according to a first embodiment.

A laser microscope according to a first embodiment of the present invention is described with reference to the drawings. FIG. 1 illustrates the configuration of a laser microscope 1 according to the first embodiment. The laser microscope 1 is a laser microscope that disperses and detects fluorescence generated by a specimen, and the laser microscope 1 includes light sources 2 to 5 that apply excitation light having wavelengths different from each other, dichroic mirrors (DMs) 6 to 9, a coupling lens 11, an optical fiber 10, a collimator lens 12, a filter unit 18, a scanning mirror 13, a pupil projection lens 14, a tube lens 15, a mirror 16, an objective 17, a not-illustrated stage that fixes a specimen S, a confocal lens 19, a confocal pinhole 20, a collimator lens 21, a diffraction grating 22, a mirror 23, a condenser lens 24, a slit 25, a photomultiplier tube (PMT) 26 that is a high-sensitivity photodetector, and a control unit 30.

The light sources 2 to 5 emit rays of excitation light that have wavelengths different from each other, and excitation light is switched to the ON state or the OFF state for each of the light sources. Namely, the light sources 2 to 5 function as a light source unit that can selectively emit excitation light that passes through the optical fiber 10 and the like and is applied to the specimen S via the objective 17 from among plural types of excitation light having wavelengths different from each other. Note that switching of each of the light sources to the ON state or the OFF state is controlled by the control unit 30 described later. Excitation light used in this embodiment is defined in practice such that the wavelength of excitation light emitted from the light source 2 is 405 nm, the wavelength of excitation light emitted from the light source 3 is 488 nm, the wavelength of excitation light emitted from the light source 4 is 561 nm, and the wavelength of excitation light emitted from the light source 5 is 640 nm.

The specimen S is dyed in advance by using a plurality of fluorochromes that absorb excitation light emitted from the respective light sources 2 to 5 and emit fluorescence. The wavelength of the excitation light emitted from each of the light sources 2 to 5 may be a peak wavelength of an excitation spectrum of a corresponding fluorochrome.

The scanning mirror 13 scans the specimen S by using excitation light emitted from a light source in the ON state, by changing the position in which the specimen S is irradiated with the excitation light on a plane that is perpendicular to an optical axis of the objective 17. As an example, it is considered that the scanning mirror 13 is configured by a pair of galvanometer mirrors that perform raster scanning.

The filter unit 18 includes optical filters 18a, 18b, 18c, and 18d that split light to be transmitted and light to be reflected at specific wavelengths different from each other, and the filter unit 18 has a configuration that can switch an optical filter that is arranged on an optical path. FIG. 1 illustrates a state in which the optical filter 18a is arranged on the optical path. The filter unit 18 is, for example, a filter cassette that has a driving mechanism that switches an optical filter that is arranged on the optical path.

Each of the optical filters included in the filter unit 18 is a long-pass filter that reflects light for which a wavelength is shorter than a specific wavelength and that transmits light for which a wavelength is longer than or equal to the specific wavelength, and the above specific wavelength at which light is split changes for each of the optical filters. More specifically, the filter unit 18 includes optical filters 18a, 18b, 18c, and 18d that respectively correspond to the light sources 2 to 5 and that each split light at a specific wavelength that is slightly longer than the wavelength of excitation light emitted from each of the light sources 2 to 5. The filter unit 18 is a fluorescence-splitting mechanism that splits fluorescence generated by the specimen S and excitation light according to a wavelength, and a wavelength at which the fluorescence and the excitation light are split can be changed according to switching of the respective optical filters. By arranging, on the optical path, an optical filter that corresponds to a light source to be used (an optical filter that splits light at a wavelength that is slightly longer than an excitation wavelength of the light source to be used), excitation light is prevented from entering a detection light path to the PMT 26, which is a detector, and fluorescence generated by the specimen S due to the excitation light is transmitted to the detection light path. Note that switching of the respective optical filters is controlled by the control unit 30 described later.

The diffraction grating 22 is a diffraction grating that disperses fluorescence collimated by the collimator lens 21 (without including the excitation light split by the filter unit 18). Namely, the diffraction grating 22 is a spectroscopic mechanism that disperses the fluorescence split by the filter unit 18, which is a fluorescence-splitting mechanism.

The mirror 23 is a mirror that reflects the fluorescence dispersed by the diffraction grating 22. The wavelength of fluorescence that enters the PMT 26 can be changed by changing an angle of the mirror 23. Namely, by changing the angle of the mirror 23, scanning can be performed in which an optical spectrum of fluorescence for which a horizontal axis indicates a wavelength and a vertical axis indicates the intensity of fluorescence is obtained. Hereinafter, the scanning above is referred to as λ-scanning. In addition, it can also be said that the mirror 23 is a detection wavelength changing mechanism that changes the wavelength of fluorescence detected by the PMT 26, which is a detector. In this embodiment, in λ-scanning, the angle of the mirror 23 is changed in such a way that a detection wavelength is changed from a short-wavelength side to a long-wavelength side.

The control unit 30 is a control device that controls the operations of respective units included in the laser microscope 1, and the control unit 30 is, for example, a computer. The control unit 30 is a control device that controls changing of the angle of the mirror 23, switching of the light sources 2 to 5 to the ON state or the OFF state, and switching of an optical filter that is arranged on an optical path among the optical filters included in the filter unit 18, namely, a fluorescence-splitting mechanism, in particular, in this embodiment. More specifically, the control unit 30 performs control to switch the light sources 2 to 5 to the ON state or the OFF state, and to switch an optical filter included in the filter unit 18, which is the fluorescence-splitting mechanism, namely, to change a wavelength at which the fluorescence-splitting mechanism splits light, in accordance with λ-scanning performed by changing the angle of the mirror 23.

By employing the laser microscope 1 having the configuration above, and in particular, by performing control by using the control unit 30, an accurate optical spectrum of fluorescence can be obtained even when λ-scanning is performed by using plural types of excitation light. Here, a method for performing λ-scanning by using plural types of excitation light is described before describing control performed by the control unit 30 according to this embodiment.

A method for performing λ-scanning while switching plural types of excitation light, namely, a method for switching a light source to be used according to λ-scanning, is described below with reference to FIG. 2 to FIG. 5. FIG. 2 to FIG. 5 describe a case in which λ-scanning is performed while switching four types of excitation light that respectively correspond to 405 nm, 488 nm, 561 nm, and 640 nm, similarly to this embodiment. It is assumed that a wavelength at which λ-scanning is started (a wavelength at which the PMT 26, which is a detector, starts detection) is a wavelength that is slightly longer than the lowest wavelength of the wavelengths of emitted excitation light. This is because fluorescence generated by the specimen S is generated on a long-wavelength side of the excitation light, and in the example of FIGS. 2 to 5, it is assumed that 405 nm+Δλ, which is slightly longer than a wavelength of 405 nm of the excitation light, is a wavelength at which λ-scanning is started. Note that Δλ is a value that is specified in advance in such a way that the excitation light is prevented from leaking into the detector. Δλ is a value that is about a tolerance of a center wavelength of a laser, and as an example, when it is assumed that a center wavelength of a semiconductor laser having a nominal value of 405 nm is 405±5 nm, Δλ is a value that slightly exceeds 5 nm. As Δλ increases, noise generated in a fluorescent image can be reduced. In addition, in the example of FIGS. 2 to 5, the end of a detection wavelength range that is detected by the PMT 26 in λ-scanning is specified to be 800 nm. Accordingly, in this case, the entirety of the detection wavelength range that is detected by the detector in λ-scanning ranges from 405 nm+Δλ to 800 nm.

Each of FIGS. 2 to 5 illustrates the ON/OFF state of each of the light sources, and a remaining detection wavelength range in which the PMT 26, which is a detector, performs detection in the state. In FIGS. 2 to 5, state I indicates the ON/OFF state of a light source that emits excitation light of 405 nm, and similarly, each of states II to IV indicates the ON/OFF state of a light source that emits excitation light of 488 nm, 561 nm, or 640 nm. In FIGS. 2 to 5, when states I to IV are illustrated with a solid line, a corresponding light source is in the ON state, and when states I to IV are illustrated with a broken line, a corresponding light source is in the OFF state. As an example, in FIG. 2, state I is illustrated with a solid line, and therefore a light source that emits excitation light of 405 nm is in the ON state. The other states II to IV are illustrated with a broken line, and therefore each of the light sources that emits excitation light of 488 nm, 561 nm, or 640 nm is in the OFF state.

In addition, in FIGS. 2 to 5, a region W surrounded with a bold broken line indicates a remaining detection wavelength range in which the PMT 26, which is a detector, performs detection in the states illustrated in the respective drawings.

Figure 2:
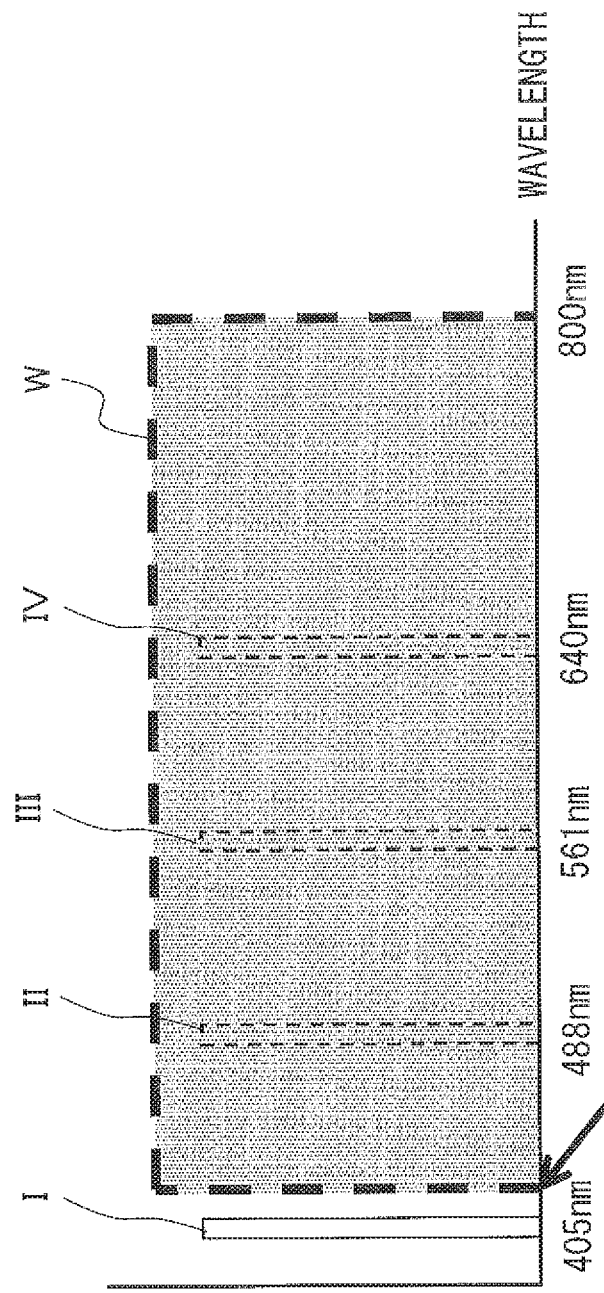
FIG. 2 illustrates a state of light sources, and a remaining detection wavelength range in which a detector performs detection in the state.

First, λ-scanning is performed in the detection wavelength range of FIG. 2, and an optical spectrum of fluorescence that is generated by the specimen S due to excitation light of 405 nm is sequentially obtained. When a detection wavelength at which detection is being performed exceeds 488 nm, which is the wavelength of excitation light of the second light source from the short-wavelength side (the light source 3 in the configuration according to this embodiment), for example, by Δλ, a light source that emits excitation light of 488 nm is switched to the ON state. At this time, a remaining detection wavelength range in which λ-scanning is performed ranges from 488 nm+Δλ to 800 nm, which is the end of the detection wavelength range, as illustrated in FIG. 3.

Figure 3:
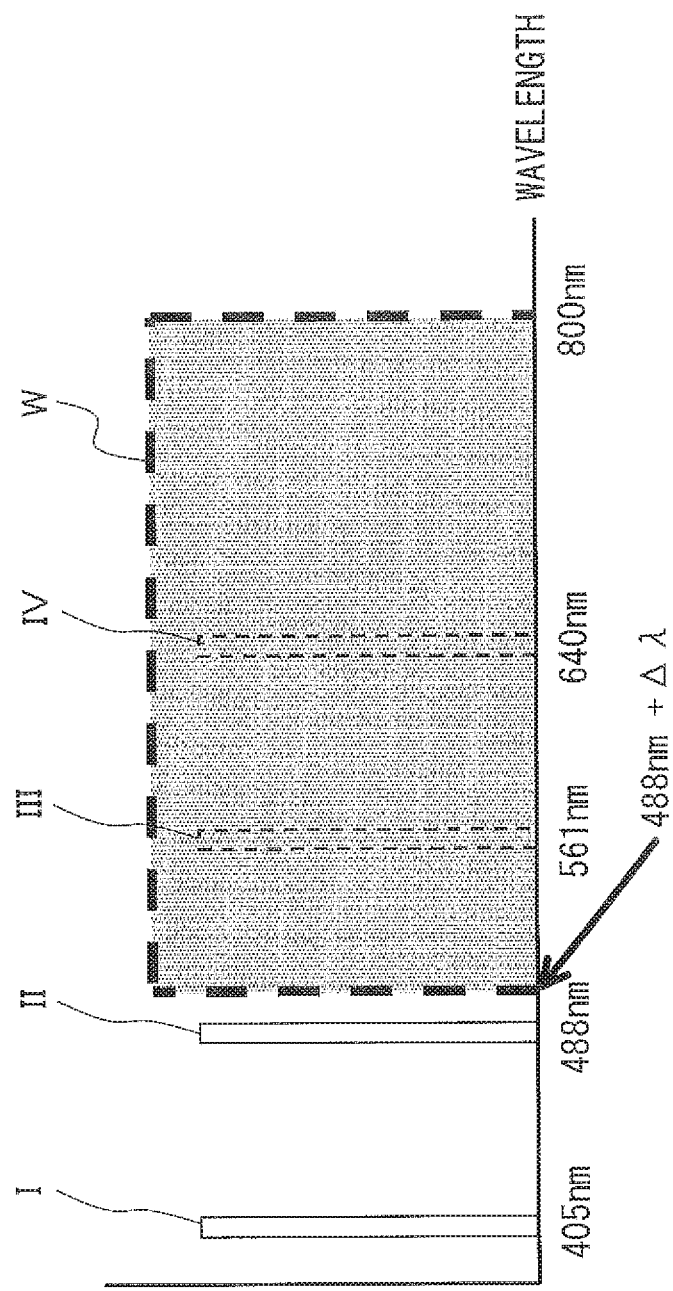
FIG. 3 illustrates another state of light sources, and a remaining detection wavelength range in which a detector performs detection in the state.
Figure 4:
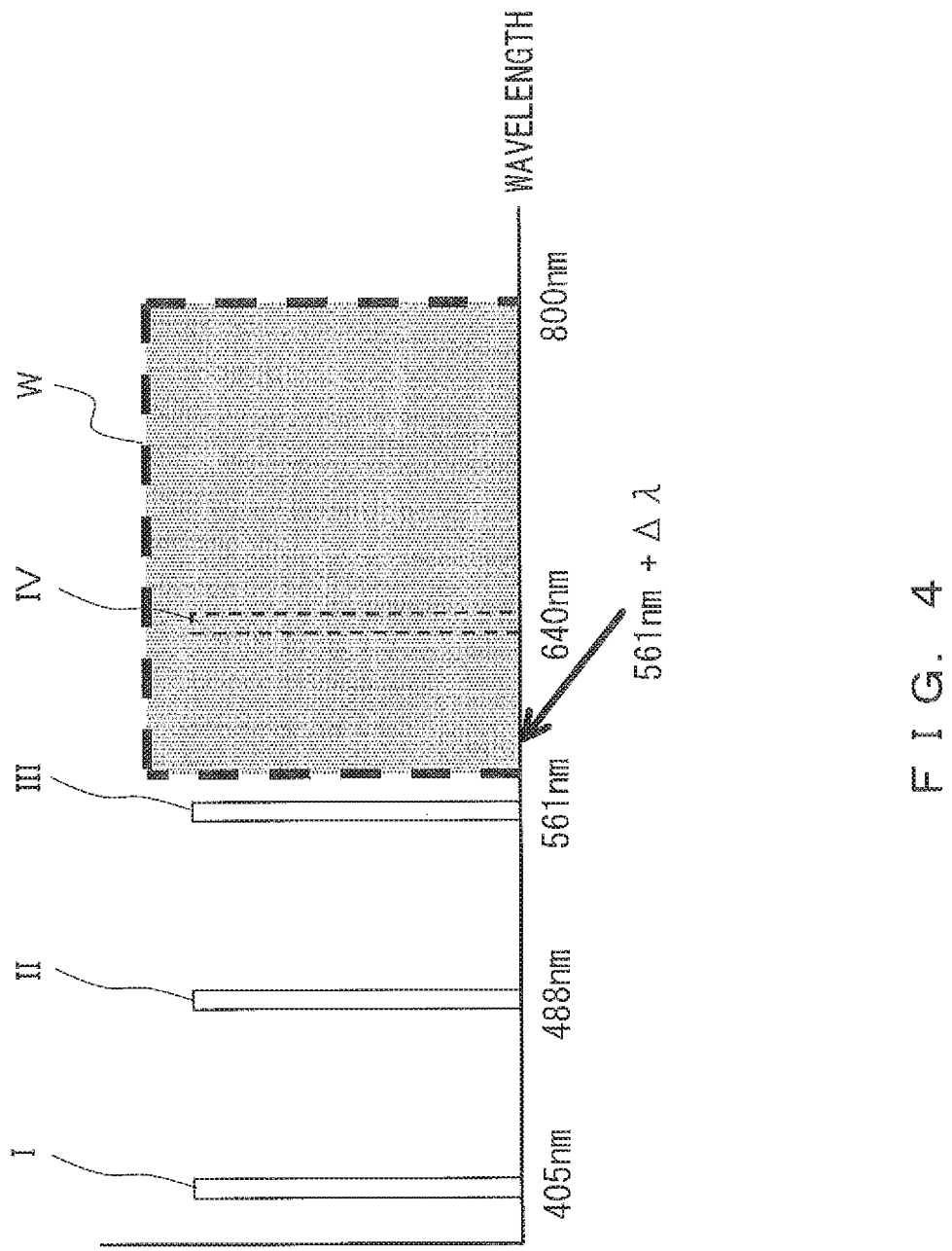
FIG. 4 illustrates yet another state of light sources, and a remaining detection wavelength range in which a detector performs detection in the state.

Thereafter, λ-scanning is similarly performed in the remaining detection wavelength range illustrated in FIG. 3 (the region W in FIG. 3). When a detection wavelength at which detection is being performed exceeds 561 nm, which is the wavelength of excitation light of the third light source (the light source 4 in the configuration according to this embodiment), by Δλ, a light source that emits excitation light of 561 nm is switched to the ON state (the state illustrated in FIG. 4). Then, λ-scanning is similarly performed in the remaining detection wavelength range illustrated in FIG. 4 (the region W in FIG. 4). When a detection wavelength at which detection is being performed exceeds 640 nm, which is the wavelength of excitation light of the fourth light source (the light source 5 in the configuration according to this embodiment), by Δλ, a light source that emits excitation light of 640 nm is switched to the ON state (the state illustrated in FIG. 5), and λ-scanning is performed in a region to 800 nm, which is the end of a specified wavelength range.

In the method above, by using plural types of excitation light and performing λ-scanning while sequentially switching the plural types of excitation light, an optical spectrum of fluorescence can be obtained. Meanwhile, in a state in which a light source is in the ON state, excitation light needs to be split such that the excitation light is not detected by the detector. In this case, it is conventionally considered that, even when plural types of excitation light are applied, the respective types of excitation light are split from the detector by using, for example, a multi-bandpass DM that transmits light in a plurality of wavelength ranges as an optical filter.

FIG. 6 illustrates a state of an optical spectrum that is detected when the specimen S is irradiated with excitation light of 488 nm in a case in which a DM that does not transmit a wavelength of excitation light of each of the light sources is used as an optical filter. In FIG. 6, a horizontal axis indicates a wavelength, and a vertical axis indicates a transmittance (T (%)) of light. In addition, a region surrounded with broken line A indicates a wavelength range of light that can be detected by an optical filter (in this example, a multi-bandpass DM), alternating long and short dashed line B indicates an optical spectrum of generated fluorescence, and solid line C indicates an optical spectrum that is actually detected by the detector via the optical filter. Referring to FIG. 6, the generated fluorescence is removed in a wavelength range in which excitation light of 561 nm is removed (reflected by the DM), and an optical spectrum of a portion of fluorescence cannot be detected by the detector. As described above, in a case in which, under the assumption that plural types of excitation light having wavelengths different from each other are applied, a multi-bandpass DM that removes the plural types of excitation light is used as an optical filter, a problem arises wherein wavelengths that overlap the wavelengths of the plural types of excitation light are removed from the wavelengths to be measured of fluorescence.

In the laser microscope 1 according to this embodiment, in particular, by performing control by using the control unit 30, an accurate optical spectrum of fluorescence can be obtained without generating the problem above, even when λ-scanning is performed by using plural types of excitation light. Control performed by the control unit 30 is described below in detail with reference to the drawings.

Figure 8:
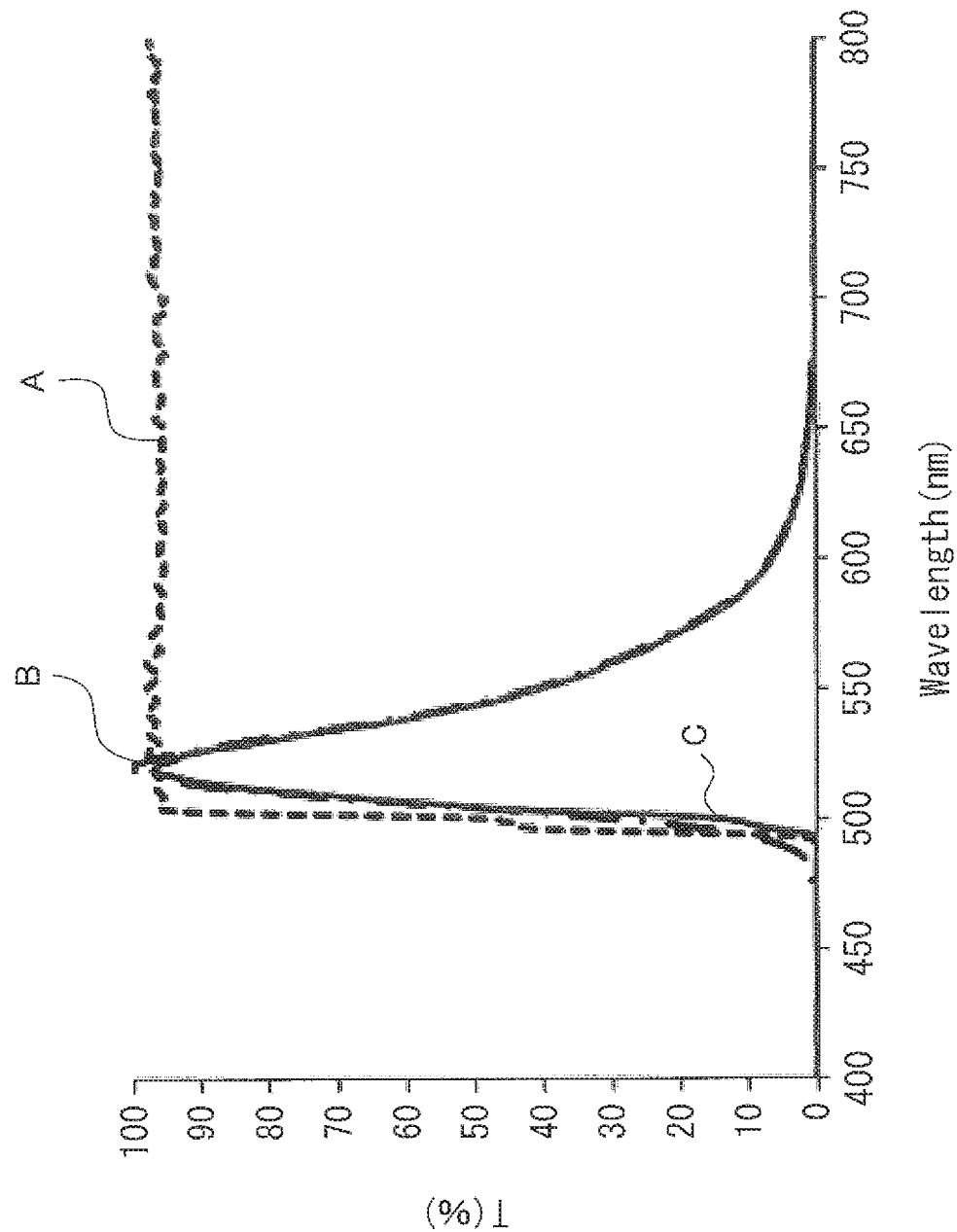
FIG. 8 illustrates an optical spectrum of detected fluorescence in a state in which another optical filter is arranged.
Figure 10:
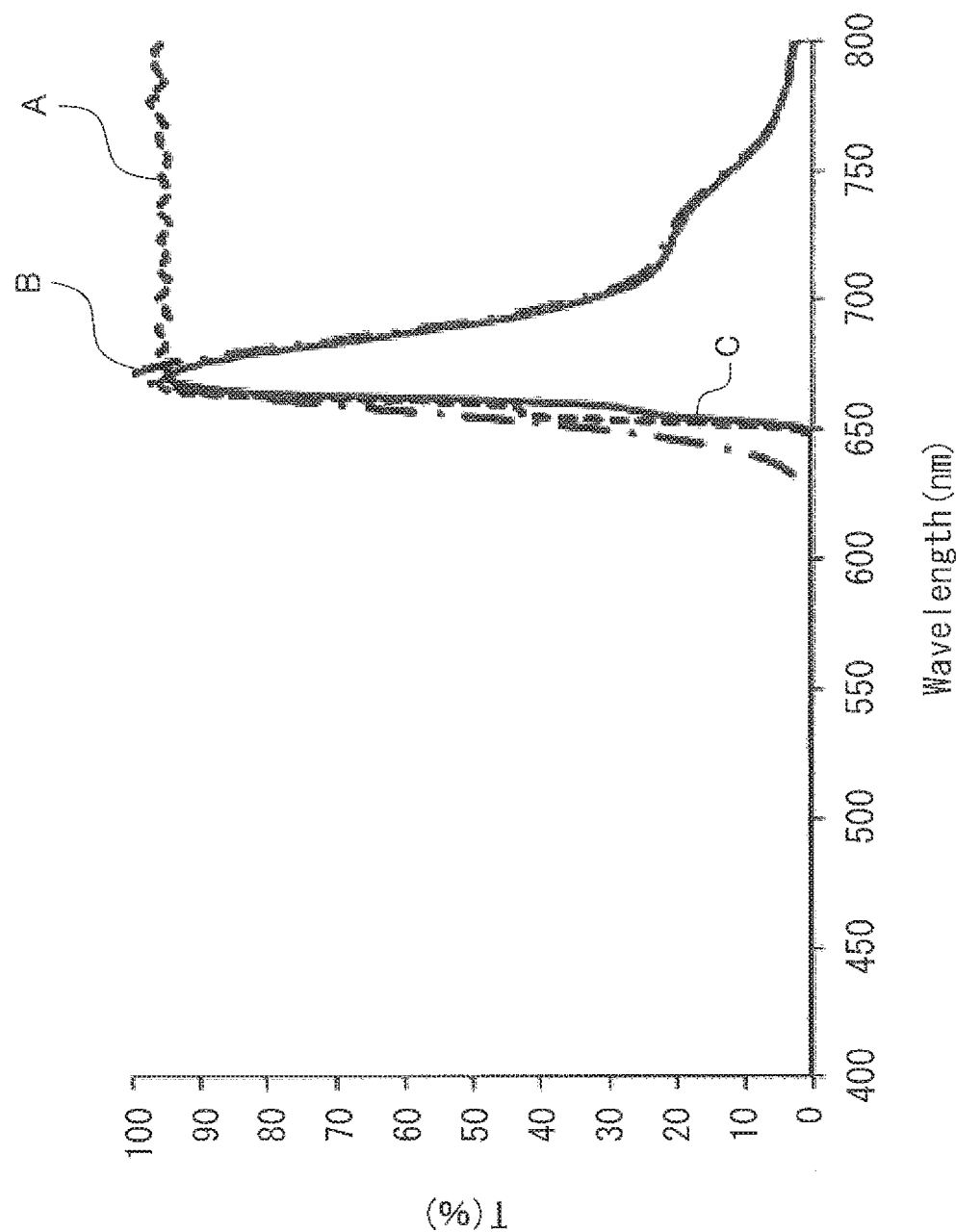
FIG. 10 illustrates an optical spectrum of detected fluorescence in a state in which yet another filter is arranged.

Each of FIG. 7 to FIG. 10 illustrates an optical spectrum of detected fluorescence in a state in which each of the light sources 2 to 5 is in the ON state and a corresponding optical filter (an optical filter that splits light at a wavelength that is slightly longer than an excitation wavelength of a light source to be used) is arranged. FIG. 7 illustrates an optical spectrum of fluorescence in a state in which the light source 2 is in the ON state and the optical filter 18a that corresponds to the light source 2 (an optical filter that splits light at a wavelength that is slightly longer than 405 nm, which is the wavelength of excitation light emitted from the light source 2) is arranged on the optical path. A region surrounded with broken line A indicates a wavelength range of light that can be detected by an optical filter (in this example, the optical filter 18a), alternating long and short dashed line B indicates an optical spectrum of generated fluorescence, and solid line C indicates an optical spectrum that is actually detected by the detector via the optical filter. Similarly, each of FIGS. 8 to 10 illustrates an optical spectrum in a state in which each of the light sources 3 to 5 is in the ON state and a corresponding optical filter is arranged. In any of the drawings, an optical spectrum (an alternating long and short dashed line) of generated fluorescence substantially corresponds to an optical spectrum (a solid line) that is actually detected by the detector via the optical filter, and it can be said that the optical spectrum of the generated fluorescence can be detected.

Stated another way, if optical spectrums of fluorescence, as illustrated with solid line C, in the states illustrated in FIGS. 7 to 10, can be continuously detected while removing excitation light from the detector, to obtain an accurate optical spectrum of fluorescence, which is an object of the present invention, can be achieved.

Figure 11:
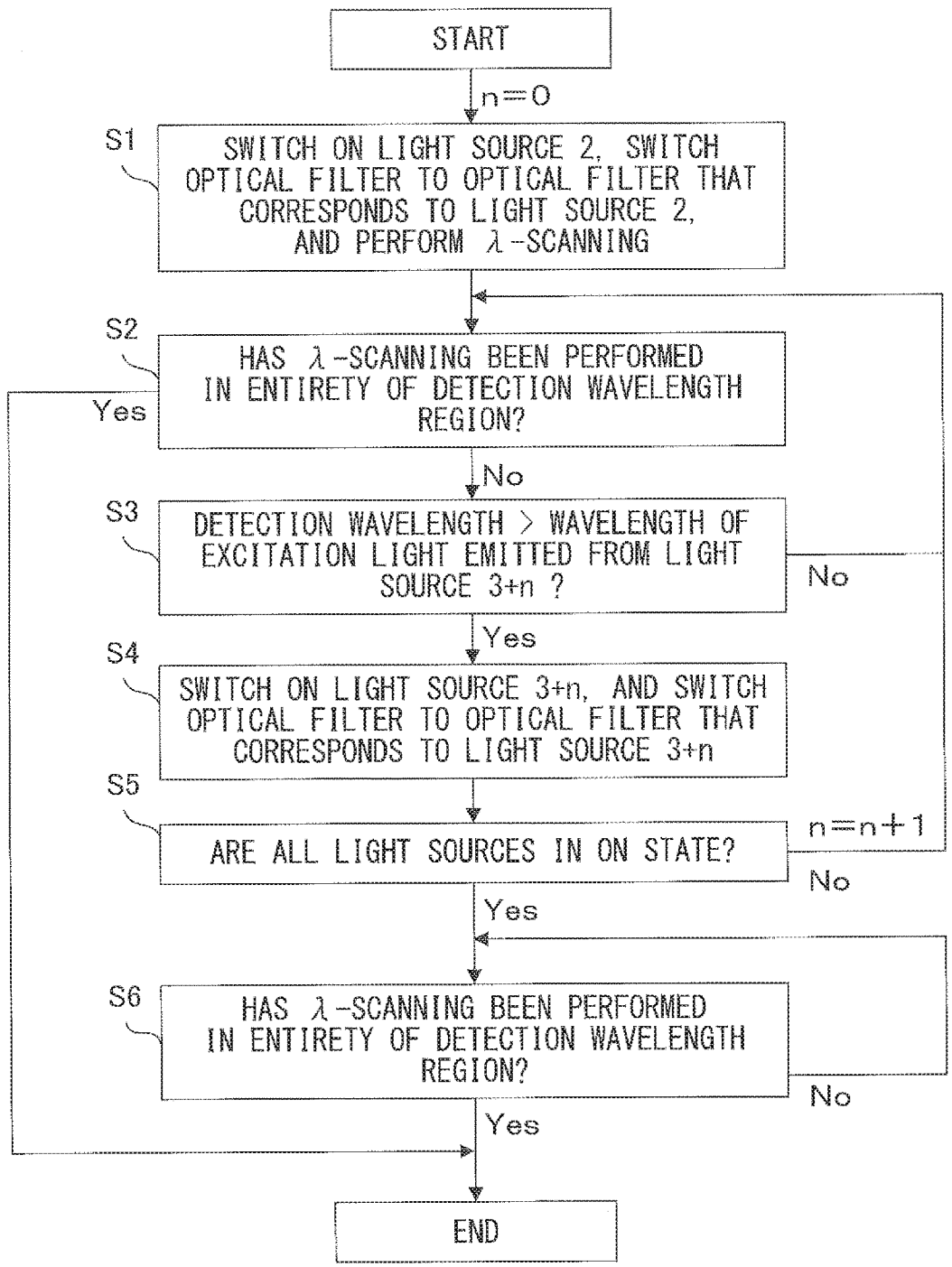
FIG. 11 is a flowchart illustrating a procedure for performing control to switch a light source and to switch an optical filter in a filter unit in accordance with λ-scanning by using the laser microscope according to the first embodiment.

FIG. 11 is a flowchart illustrating a method in which the control unit 30 performs control to switch the light sources 2 to 5 to the ON state or the OFF state and to switch an optical filter of the filter unit 18 in accordance with λ-scanning that is performed by changing the angle of the mirror 23.

The flowchart of FIG. 11 is described below. It is assumed that all of the light sources 2 to 5 are in the OFF state when the processing of this flowchart is started. The end of a detection wavelength range in which detection is performed in λ-scanning is specified to be 800 nm.

When the processing of the flowchart of FIG. 11 is started, the value n relating to a light source that will first be switched to the ON state is set to an initial value of 0, and the processing moves on to step S1. In step S1, the light source 2, which is the first light source, is switched to the ON state, and the filter unit 18 is controlled in such a way that the optical filter 18a that corresponds to the light source 2 (an optical filter that splits light at a wavelength that is slightly longer than 405 nm, which is the wavelength of excitation light emitted from the light source 2) is arranged on the optical path. Then, λ-scanning performed by changing the angle of the mirror 23 is started. Namely, in this flowchart, the entirety of a detection wavelength range in which the PMT 26 performs detection in λ-scanning ranges from a wavelength at which the optical filter 18a splits light (a wavelength that is slightly longer than 405 nm) to 800 nm.

In step S2, it is determined whether λ-scanning has been performed in the entirety of the detection wavelength range. As described above, in this embodiment, the end of the wavelength range in which detection is performed in λ-scanning is 800 nm. Scanning has not yet been performed at 800 nm, which is the end of the detection wavelength range. Therefore, the determination result in the first step 2 is No, and the processing moves on to step S3.

In step S3, it is determined whether a detection wavelength at which detection is being performed in λ-scanning is longer than the wavelength of excitation light emitted from the light source 3. When the determination result is No, λ-scanning is continued, and the determinations in steps S2 and S3 are repeated. When the determination result in step S3 is Yes, the processing moves on to step S4.

In step S4, the light source 3 is switched to the ON state, and the filter unit 18 is controlled in such a way that the optical filter 18b that corresponds to the light source 3 (an optical filter that splits light at a wavelength that is slightly longer than the wavelength of excitation light emitted from the light source 3) is arranged on the optical path. At this time, the state of the light source 2 is not switched such that the light source 2 remains in the ON state. Stated another way, after step S4, two optical spectrums are combined and detected. One of the two optical spectrums is an optical spectrum that is actually detected by the detector of fluorescence generated due to excitation light emitted from the light source 2 (the optical spectrum illustrated with solid line C in FIG. 7). The other of the two optical spectrums is an optical spectrum that is actually detected by the detector of fluorescence generated due to excitation light emitted from the light source 3 (the optical spectrum illustrated with solid line C in FIG. 8). When it takes time to arrange the optical filter 18b, λ-scanning may be temporarily stopped, and λ-scanning may be started when the arrangement of the optical filter 18b is completed.

In step S5, it is determined whether all of the light sources are in the ON state (all of the light sources 2 to 5 are in the ON state). When the determination result is No, n–n+1 is established, and the processing moves on to step S2. Thereafter, steps S2 to S5 are repeated until the determination result in step S2 is Yes, namely, it is determined that λ-scanning has been performed in the entirety of the detection wavelength range, or until it is determined in step S5 that all of the light sources are in the ON state. When the determination result in step S2 is Yes, the processing of this flowchart is terminated. When the determination result in step S5 is Yes, the processing moves on to step S6.

Step S6 is repeated until it is determined that λ-scanning has been performed in the entirety of the detection wavelength range. When it is determined that λ-scanning has been performed in the entirety of the detection wavelength range, the processing of this flowchart is terminated.

An optical spectrum of fluorescence that is detected in the processing above of the flowchart of FIG. 11 is illustrated in FIG. 12. Solid line D indicates the optical spectrum of the fluorescence that is detected in the processing of the flowchart of FIG. 11. In step S3 of the flowchart of FIG. 11, after a current detection wavelength in λ-scanning becomes longer than the wavelength of excitation light emitted from a light source 3+n, the light source 3+n is switched to the ON state, and a corresponding optical filter is arranged. Therefore, the excitation light emitted from the light source 3+n is not detected by the detector, nor is fluorescence of the current detection wavelength in λ-scanning split by the optical filter. Namely, the optical spectrum illustrated with solid line D indicates that there is no fluorescence that cannot be detected, as indicated by the optical spectrum illustrated with solid line C in FIG. 6, and that an accurate optical spectrum of fluorescence can be detected in the entirety of the detection wavelength range in which λ-scanning has been performed.

Accordingly, by employing the laser microscope 1 according to this embodiment, an accurate optical spectrum of fluorescence can be obtained even when λ-scanning is performed by using plural types of excitation light. In particular, when an optical spectrum of fluorescence is obtained by using the laser microscope 1, switching of an optical filter arranged on the optical path, namely, a fluorescence-splitting mechanism, in addition to switching of a light source, is controlled according to λ-scanning. By controlling the fluorescence-splitting mechanism, a wavelength at which light is split is changed according to the wavelength of fluorescence being detected, and excitation light is prevented from being detected by the detector, and an optical spectrum of fluorescence can be continuously detected.

In addition, a configuration may be employed in which an acoustooptical element is arranged between the DM 6 and the coupling lens 11 and excitation light applied to the specimen S is selected. In this case, all of the light sources 2 to 5 are set to be in the ON state, and light that is transmitted to the coupling lens by the acoustooptical element is selected for each of the wavelengths of the plural types of excitation light emitted from the light sources 2 to 5.

Further, in the method illustrated in FIG. 7 according to this embodiment for obtaining an optical spectrum of fluorescence according to λ-scanning, an optical spectrum is detected from the entirety of the detection wavelength range by performing one λ-scanning, but the invention is not limited to this method. As an example, λ-scanning is performed for each pair of a light source and a corresponding optical filter. In this case, after an optical spectrum of fluorescence has been sufficiently detected (as an example, when the optical spectrum of fluorescence becomes feeble such that the optical spectrum is not detected) in a state in which one light source is in the ON state and an optical filter that corresponds to the light source is arranged, the next light source is switched to the ON state. Then, λ-scanning is performed again in a state in which an optical filter arranged on the optical path is switched to an optical filter that corresponds to the next light source such that an optical spectrum of fluorescence is detected. At this time, respective detection wavelength ranges in which λ-scanning is performed may overlap. By using the method above, it takes more time to detect the optical spectrum than when using a method for performing one λ-scanning, but the optical spectrum can be detected more accurately.

Figure 13:
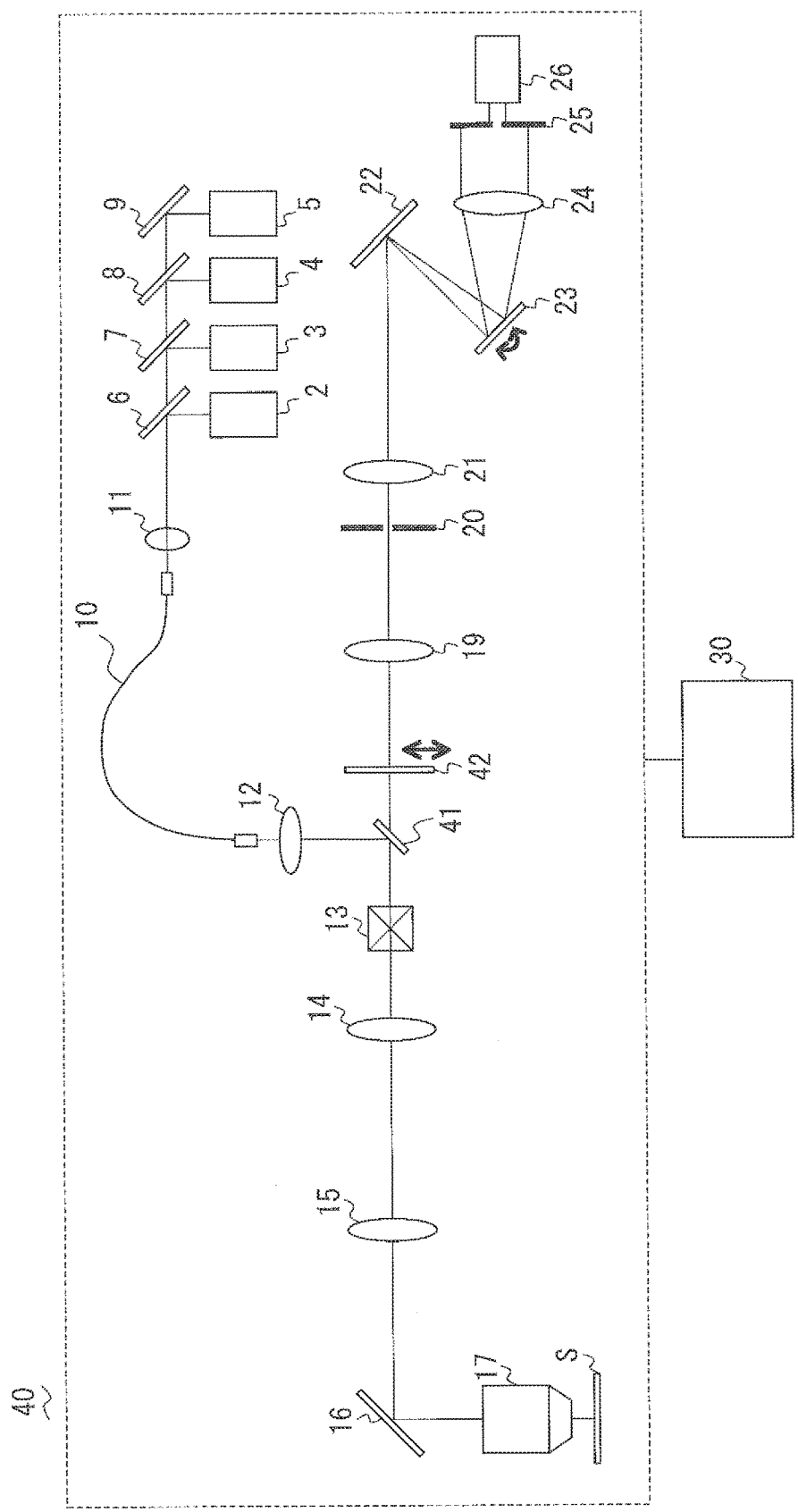
FIG. 13 illustrates the configuration of a laser microscope according to a second embodiment.

A laser microscope according to a second embodiment is described below. FIG. 13 illustrates the configuration of a laser microscope 40 according to this embodiment. The laser microscope 40 is different from the laser microscope 1 in that the laser microscope 40 includes a beam splitter 41 instead of the filter unit 18 and in that the laser microscope 40 further includes a gradation filter 42 on an optical path between the beam splitter 41 and the confocal lens 19. However, the other components are similar to those in the laser microscope 1.

The beam splitter 41 splits light, for example, by reflecting one fourth of the incident light and transmitting three fourths of the incident light.

The gradation filter 42 is similar to respective types of optical filters included in the filter unit 18 according to the first embodiment in that the gradation filter 42 is an optical filter that splits light to be transmitted and light to be reflected according to a specific wavelength. However, in the gradation filter 42, a film thickness and a transmittance at each wavelength change according to a position in a longitudinal direction. As an example, the film thickness of the gradation filter 42 is adjusted in such a way that a wavelength at which light is split (a wavelength on a boundary between a wavelength at which light is reflected and a wavelength at which light is transmitted) is shifted to a long-wavelength side in one direction of the longitudinal direction. In addition, the gradation filter 42 can be slid in the longitudinal direction, and a region arranged on the optical path can be appropriately changed. Stated another way, the gradation filter 42 is a fluorescence-splitting mechanism that splits fluorescence generated by the specimen S and excitation light according to a wavelength, and a wavelength at which light is split can be changed by sliding the gradation filter 42.

The control unit 30 performs control to switch the light sources 2 to 5 to the ON state or the OFF state and to slide the gradation filter 42 in accordance with λ-scanning that is performed by changing the angle of the mirror 23.

Accordingly, the laser microscope 40, similarly to the laser microscope 1 according to the first embodiment, enables an accurate optical spectrum of fluorescence to be obtained by controlling switching of a light source and the fluorescence-splitting mechanism in accordance with λ-scanning, even when λ-scanning is performed by using plural types of excitation light.

In addition, the laser microscope 40 includes only one type of gradation filter 42 as the fluorescence-splitting mechanism, and therefore the laser microscope 40 can exhibit similar effects in a configuration simpler than that of the laser microscope 1.

Figure 14:
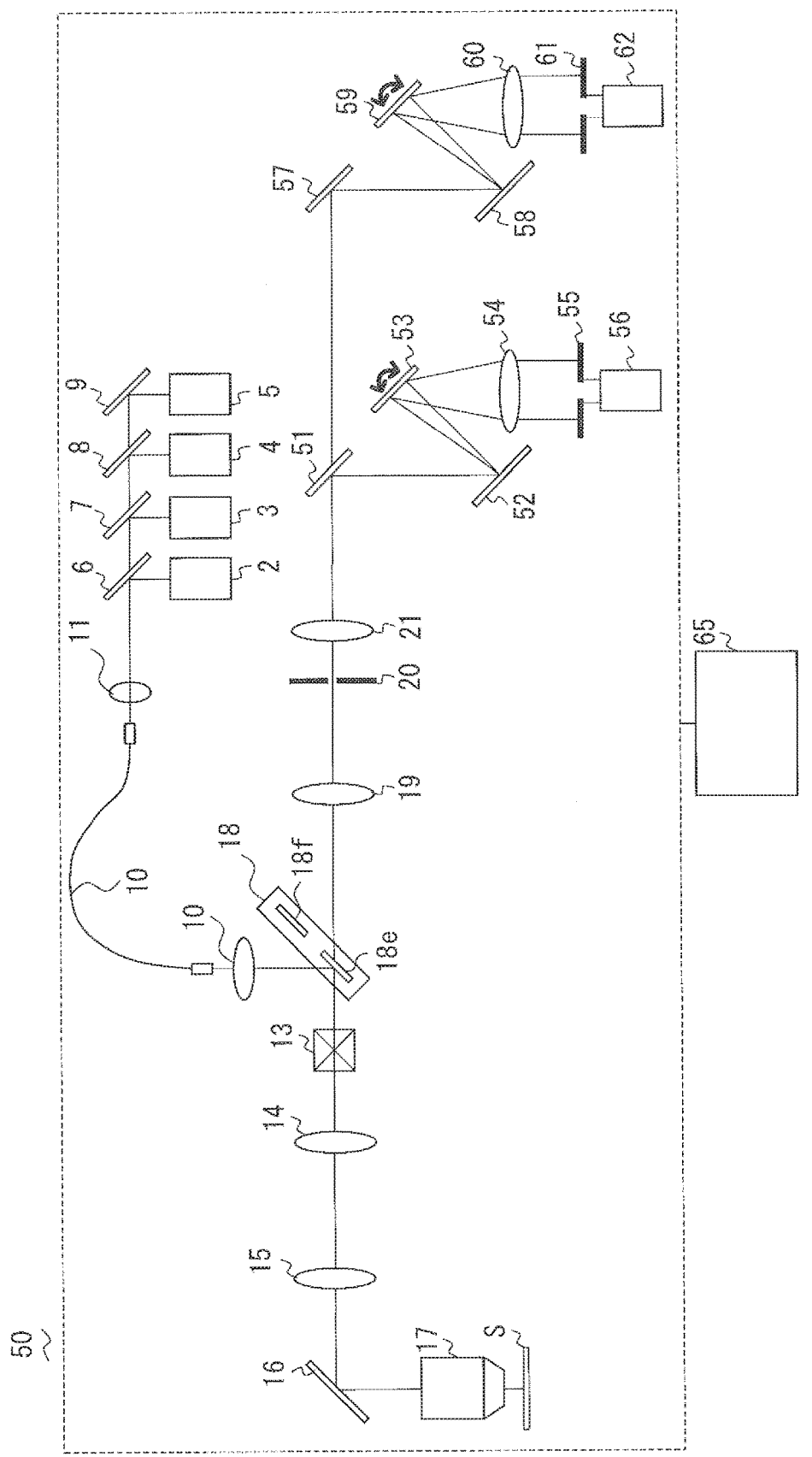
FIG. 14 illustrates the configuration of a laser microscope according to a third embodiment.

A laser microscope according to a third embodiment is described below. FIG. 14 illustrates the configuration of a laser microscope 50 according to this embodiment. The laser microscope 50 is different from the laser microscope 1 in the types of optical filters included in the filter unit 18 and in the components on a side of a detector that follow the collimator lens 21. As the components on the side of the detector that follow the collimator lens 21, the laser microscope 50 includes a DM 51 that divides an optical path into two optical paths, and also includes a diffraction grating 52, a mirror 53, a condenser lens 54, a slit 55, and a PMT 56 on one of the optical paths divided by the DM 51. The laser microscope 50 also includes mirrors 57 and 59, a diffraction grating 58, a condenser lens 60, a slit 61, and a PMT 62 on the other of the optical paths divided by the DM 51. Further, the laser microscope 50 includes a control unit 65. The diffraction gratings 52 and 58 are mechanisms that disperse fluorescence, and the mirrors 53 and 59 are mirrors that reflect respective rays of fluorescence dispersed by the diffraction gratings 52 and 58, and λ-scanning can be performed by changing the angles of the mirrors 53 and 59.

In addition, the DM 51 uses a wavelength that is slightly longer than 561 nm, which is the wavelength of excitation light emitted from the light source 4, as a wavelength at which light is split, and the DM 51 reflects light having a wavelength shorter than the wavelength at which light is split, and transmits light having a wavelength longer than or equal to the wavelength at which light is split.

Namely, the laser microscope 50 includes two detectors that obtain an optical spectrum of fluorescence, and the PMT 56 and the PMT 62 detect the optical spectrum of fluorescence in respective wavelength ranges divided by the DM 51. As an example, the specimen S can be irradiated with two types of excitation light, and the PMT 56 and the PMT 62 can individually detect an optical spectrum of generated fluorescence. This results in a decrease in detection time in comparison with a configuration including one detector.

The filter unit 18 includes optical filters 18e and 18f instead of the optical filters 18a to 18d according to the first embodiment. Each of the optical filters 18e and 18f is a notch filter that splits light by reflecting light within a specific wavelength range including the wavelength of excitation light to be used (a wavelength range between two wavelengths that are defined by two specific wavelengths), and that transmits light within a wavelength range other than the specific wavelength range. In particular, the optical filter 18e is a notch filter that uses, as a specific wavelength range of reflected light, a wavelength range that includes 405 nm, which is the wavelength of excitation light emitted from the light source 2, and that also includes a small range before and after 405 nm, and a wavelength range that includes 561 nm, which is the wavelength of excitation light emitted from the light source 4, and that also includes a small range before and after 561 nm. In addition, the optical filter 18f is a notch filter that uses, as a specific wavelength range of reflected light, a wavelength range that includes 488 nm, which is the wavelength of excitation light emitted from the light source 3, and that also includes a small range before and after 488 nm, and a wavelength range that includes 640 nm, which is the wavelength of excitation light emitted from the light source 5, and that also includes a small range before and after 640 nm.

The control unit 65 performs control to change the angles of the mirrors 53 and 59, to switch the light sources 2 to 5 to the ON state or the OFF state, and to switch an optical filter that is arranged on an optical path from among the optical filters included in the filter unit 18, in particular, in this embodiment. More specifically, the control unit 65 performs control to switch the light sources 2 to 5 to the ON state or the OFF state and to switch an optical filter included in the filter unit 18 in accordance with λ-scanning that is performed by changing the angles of the mirrors 53 and 59.

Figure 15:
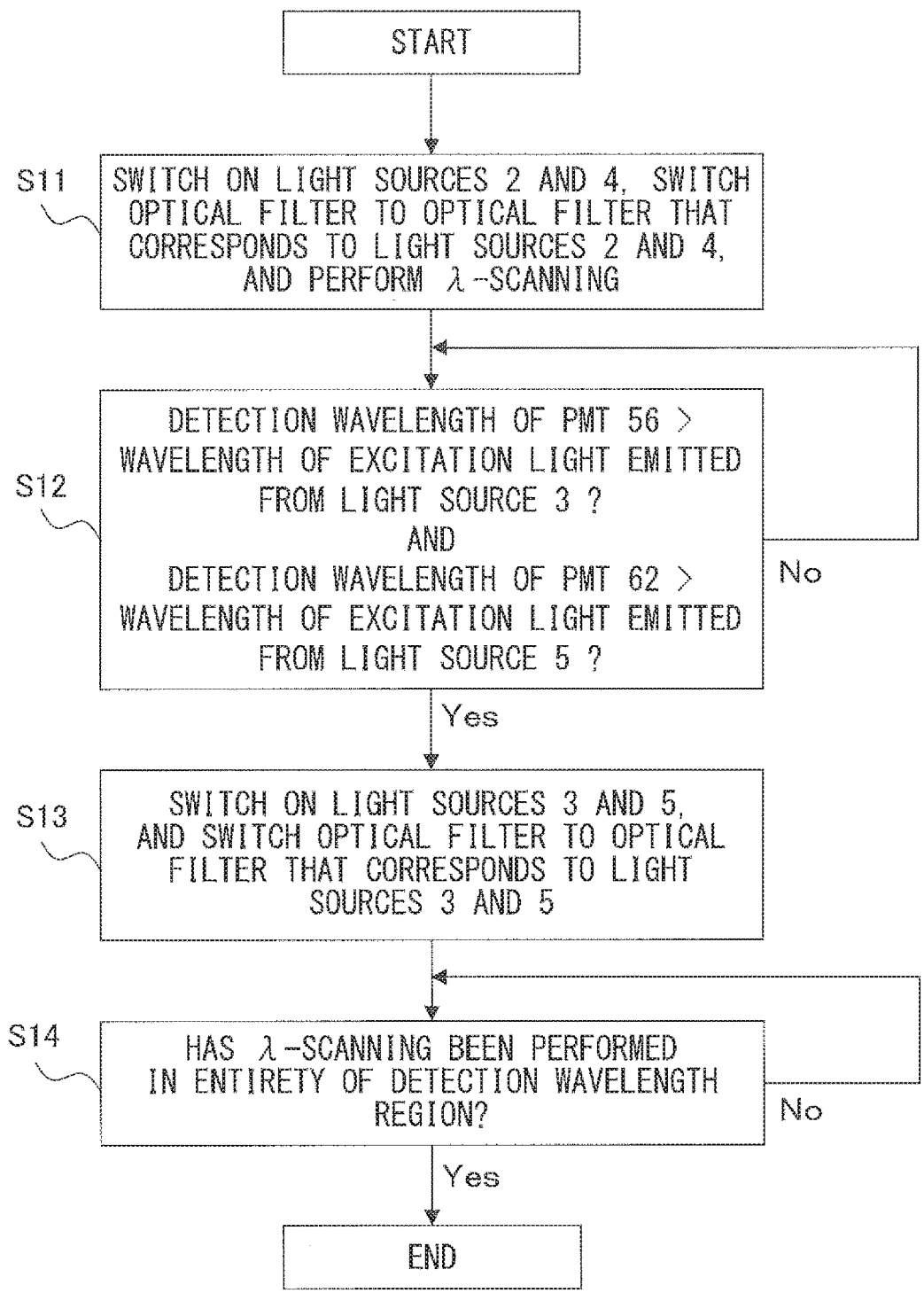
FIG. 15 is a flowchart illustrating a procedure for performing control to switch a light source and to switch an optical filter in a filter unit in accordance with λ-scanning by using the laser microscope according to the third embodiment.
Figure 16:
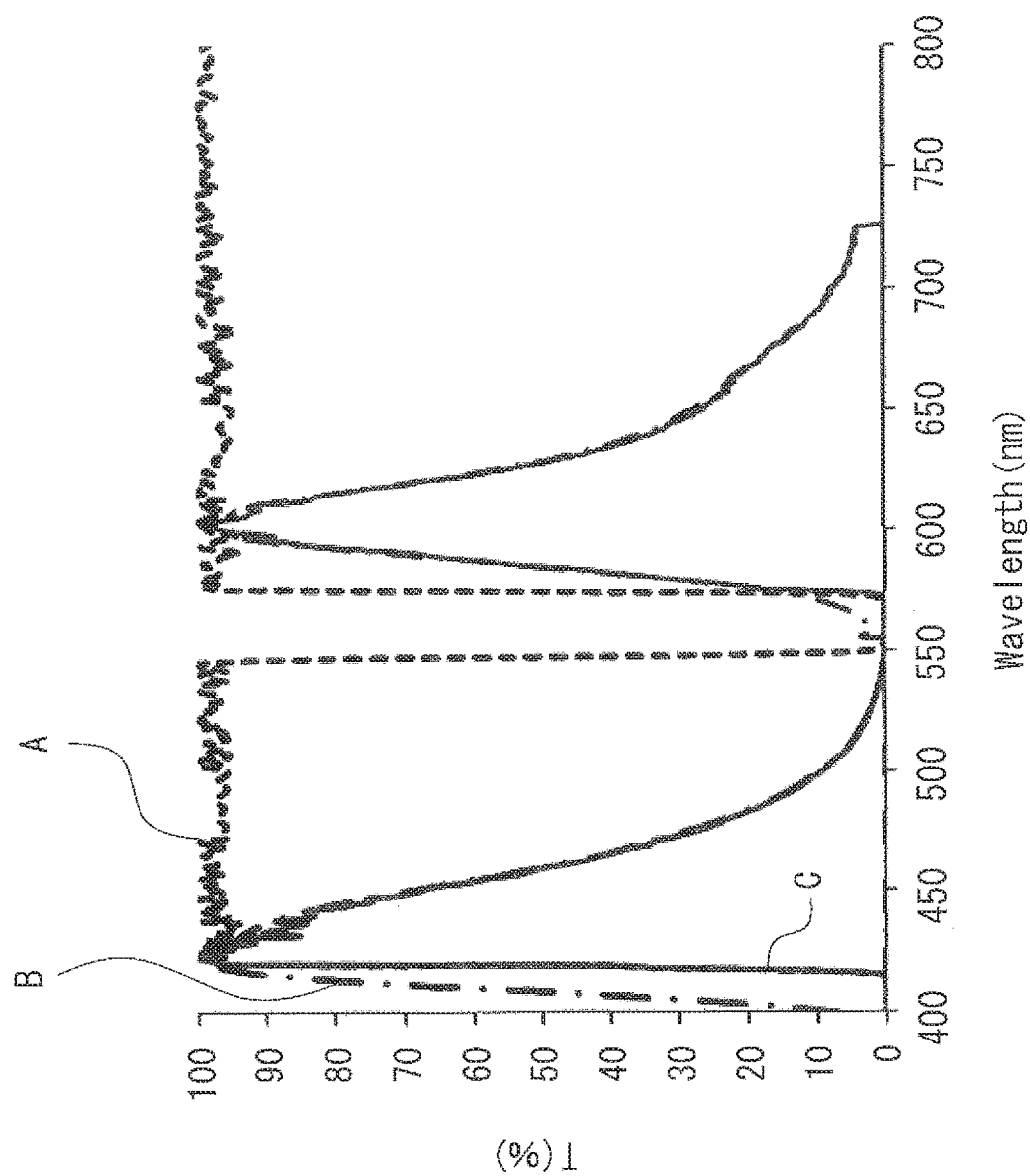
FIG. 16 illustrates an optical spectrum of detected fluorescence in a state in which an optical filter is arranged.
Figure 17:
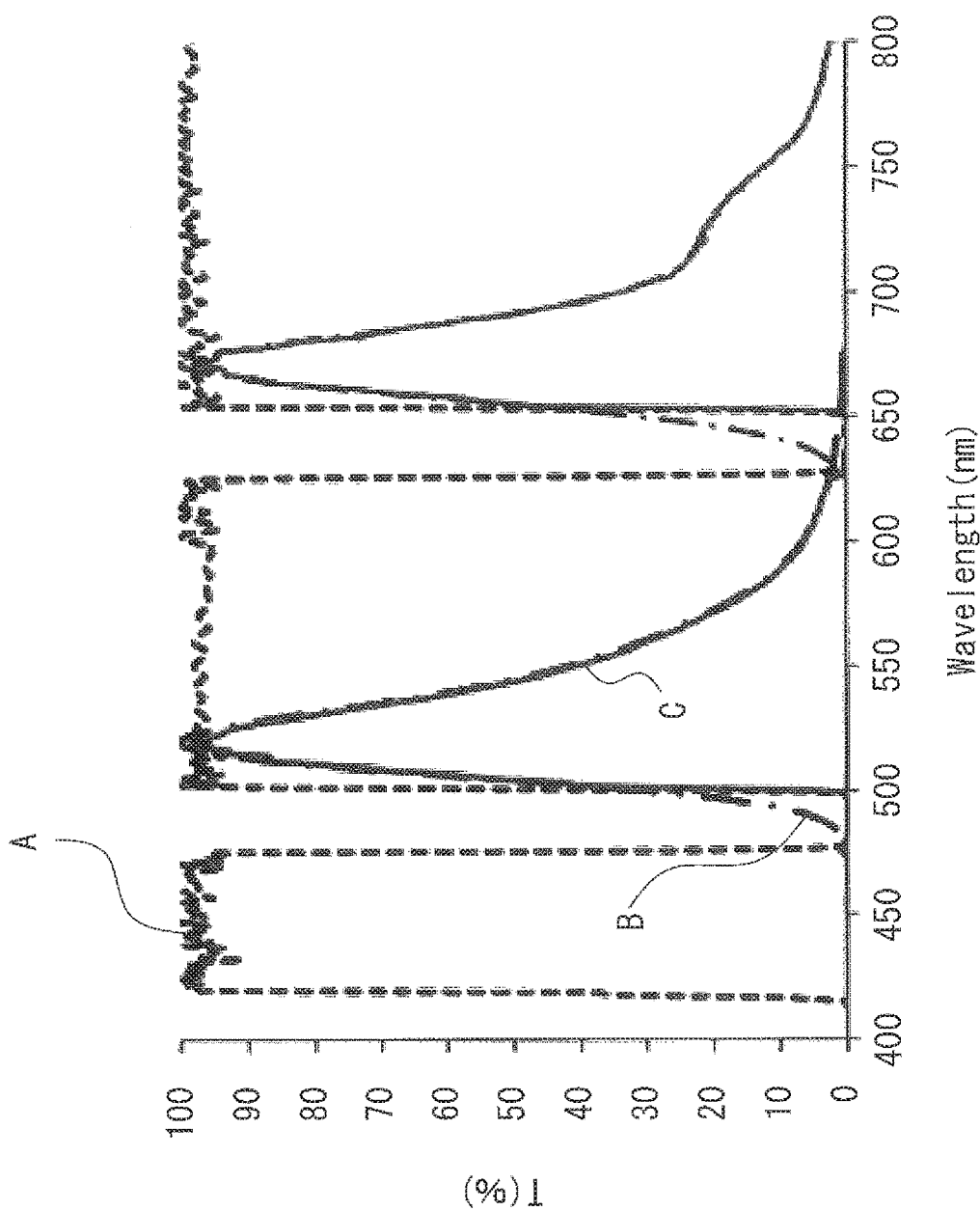
FIG. 17 illustrates an optical spectrum of detected fluorescence in a state in which another optical filter is arranged.

An example of control performed by the control unit 65 is described below with reference to the drawings. FIG. 15 is a flowchart illustrating a procedure in which the control unit 65 performs control to switch the light sources 2 to 5 to the ON state or the OFF state and to switch an optical filter in a filter unit 18 in accordance with λ-scanning that is performed by changing the angles of the mirrors 53 and 59. FIGS. 16 and 17 illustrate optical spectrums of detected fluorescence in states in which respective optical filters are arranged. The processing of the flowchart of FIG. 15 is described below with reference to FIGS. 16 and 17. It is assumed that all of the light sources 2 to 5 are in the OFF state when the processing of this flowchart is started. The end of a detection wavelength range in which detection is performed in λ-scanning is specified to be 800 nm.

When the processing of the flowchart of FIG. 15 is started, in step S11, the light source 2 and the light source 4 are switched to the ON state, and the filter unit 18 is controlled in such a way that the optical filter 18e that corresponds to the light sources 2 and 4 is arranged on an optical path. The optical filter 18e is an optical filter that reflects and splits light within a wavelength range including 405 nm, which is the wavelength of excitation light emitted from the light source 2, and that reflects and splits light within a wavelength range including 561 nm, which is the wavelength of excitation light emitted from the light source 4. Then, λ-scanning is started.

In this state, λ-scanning is performed while changing the angles of the mirrors 53 and 59 such that the optical spectrum illustrated in FIG. 16 is detected. A region surrounded with broken line A indicates a wavelength range of light that can be detected by an optical filter (in this example, the optical filter 18e), alternating long and short dashed line B indicates an optical spectrum of generated fluorescence, and solid line C indicates an optical spectrum that is actually detected by the detector. Here, a specific wavelength range in which the optical filter 18e splits light is sufficiently distant from an optical spectrum of fluorescence generated due to excitation light emitted from the light source 2. Therefore, in the specific wavelength range, the optical spectrum of the fluorescence that is generated due to the excitation light emitted from the light source 2 is sufficiently attenuated, and the specific wavelength range hardly affects the detection of the optical spectrum.

In step S12, it is determined whether a detection wavelength at which the PMT 56 performs detection has become a wavelength that is longer than the wavelength of excitation light emitted from the light source 3, and whether a detection wavelength at which the PMT 62 performs detection has become a wavelength that is longer than the wavelength of excitation light emitted from the light source 5. When the determination result is No, λ-scanning is continued, and the determination in step S12 is repeated. When the determination result is Yes, the processing moves on to step S13.

In step S12, as an example, when only the detection wavelength of the PMT 56 becomes longer than the wavelength of the excitation light emitted from the light source 3, λ-scanning of the mirror 53 may be temporarily stopped. A time period of a temporary stop is a period until the detection wavelength at which the PMT 62 performs detection in λ-scanning of the mirror 59 becomes longer than the wavelength of the excitation light emitted from the light source 5. When only the detection wavelength at which the PMT 52 performs detection becomes longer than the wavelength of the excitation light emitted from the light source 5, λ-scanning of the mirror 59 may be temporarily stopped. A time period of a temporary stop is a period until the detection wavelength at which the PMT 56 performs detection in λ-scanning of the mirror 53 becomes longer than the wavelength of the excitation light emitted from the light source 3.

In step S13, the light source 3 and the light source 5 are switched to the ON state, and the filter unit 18 is controlled in such a way that the optical filter 18f that corresponds to the light sources 3 and 5 is arranged on the optical path. The optical filter 18f is an optical filter that reflects and splits light within a wavelength range including 488 nm, which is the wavelength of the excitation light emitted from the light source 3, and that reflects and splits light within a wavelength range including 640 nm, which is the wavelength of the excitation light emitted from the light source 5. When it takes time to arrange the optical filter 18f, λ-scanning may be temporarily stopped, and λ-scanning may be restarted when the arrangement of the optical filter 18f is completed.

In this state, λ-scanning is performed while changing the angles of the mirrors 53 and 59 such that the optical spectrum illustrated in FIG. 17 is detected. A region surrounded with broken line A indicates a wavelength range of light that can be detected by an optical filter (in this example, the optical filter 18f), alternating long and short dashed line B indicates an optical spectrum of generated fluorescence, and solid line C indicates an optical spectrum that is actually detected by the detector. Here, a specific wavelength range in which the optical filter 18f splits light is sufficiently distant from an optical spectrum of fluorescence that is generated due to the excitation light emitted from the light source 3. Therefore, in the specific wavelength range, the optical spectrum of the fluorescence that is generated due to the excitation light emitted from the light source 3 is sufficiently attenuated, and the specific wavelength range hardly affects the detection of the optical spectrum.

Step S14 is repeated until it is determined that λ-scanning has been performed in the entirety of the detection wavelength range. When it is determined that λ-scanning has been performed in the entirety of the detection wavelength range, the processing of this flowchart is terminated.

Also by performing the processing above of the flowchart of FIG. 15, the optical spectrum of fluorescence illustrated in FIG. 12 can be detected. Namely, an accurate optical spectrum of fluorescence can be detected in the entirety of the detection wavelength range in which λ-scanning is performed.

Accordingly, also by employing the laser microscope 50 according to this embodiment, an accurate optical spectrum of fluorescence can be obtained when λ-scanning is performed by using plural types of excitation light. In addition, the specimen S can be irradiated with two types of excitation light, and an optical spectrum of generated fluorescence can be individually detected by the PMT 56 and the PMT 62. This results in a decrease in detection time in comparison with a configuration including one detector.

Figure 18:
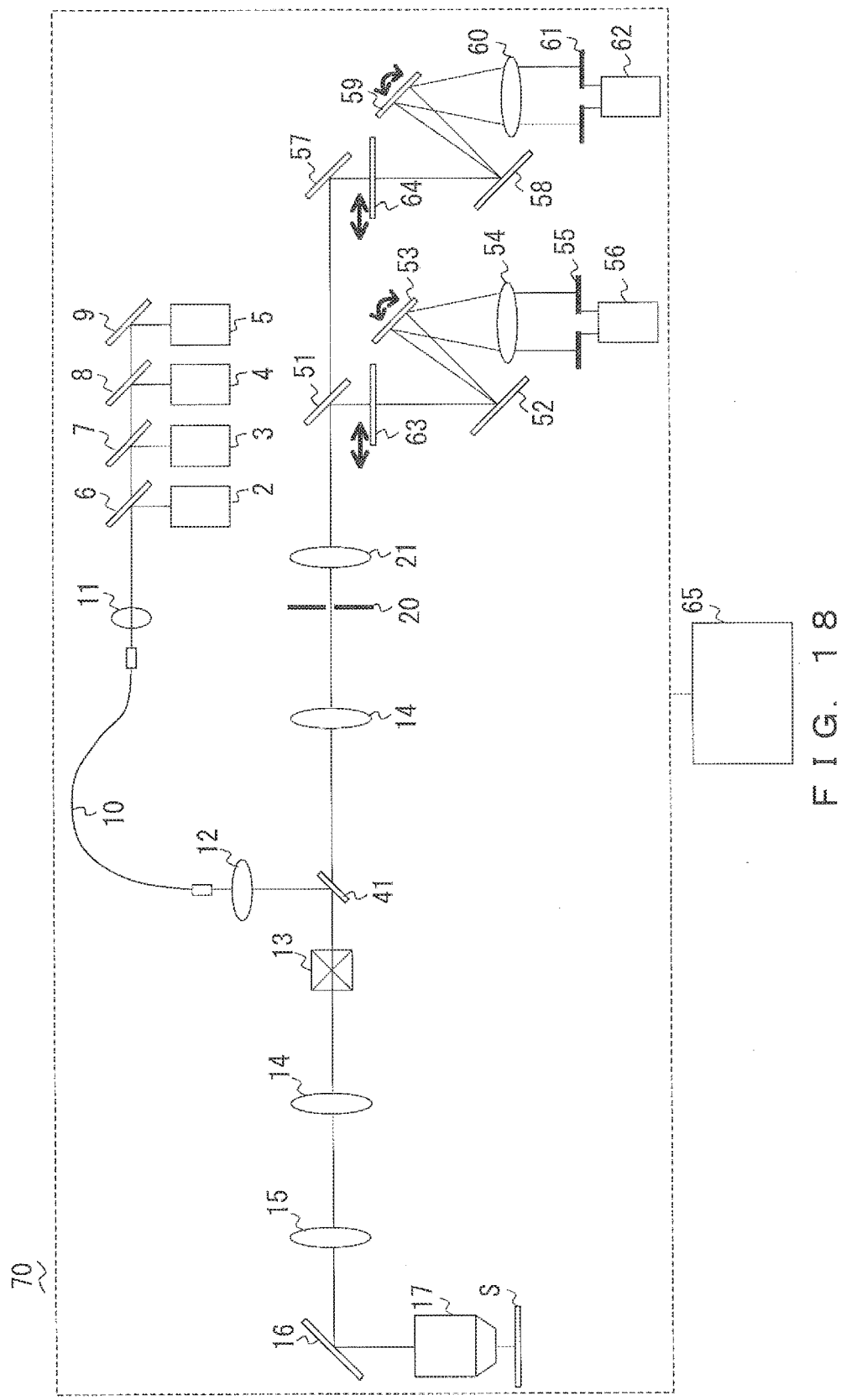
FIG. 18 illustrates the configuration of a laser microscope according to a fourth embodiment.

A laser microscope according to the fourth embodiment is described below. FIG. 18 illustrates the configuration of a laser microscope 70 according to this embodiment. The laser microscope 70 is different from the laser microscope 50 in that the laser microscope 70 includes a beam splitter 41 instead of the filter unit 18, includes a gradation filter 63 between the DM 51 and the diffraction grating 52, and includes a gradation filter 64 between the mirror 57 and the diffraction grating 58. The other components in the laser microscope 70 are similar to those in the laser microscope 50.

In the gradation filters 63 and 64, similarly to the gradation filter 42, a film thickness and a transmittance at each wavelength change according to a position in a longitudinal direction. In addition, the gradation filters 63 and 64 can be slid in the longitudinal direction, and a region arranged on an optical path is appropriately changed. Stated another way, both of the gradation filters 63 and 64 are fluorescence-splitting mechanisms that split fluorescence generated by the specimen S and excitation light according to a wavelength.

The gradation filter 63 is designed in such a way that a wavelength at which light is split is changed within a wavelength range in which the PMT 56 can perform detection, namely a wavelength range in which the DM 51 reflects light. In addition, the gradation filter 64 is designed in such a way that a wavelength at which light is split is changed within a wavelength range in which the PMT 62 can perform detection, namely a wavelength range in which the DM 51 transmits light.

Accordingly, also by employing the laser microscope 70, similarly to the laser microscope 50 according to the third embodiment, an accurate optical spectrum of fluorescence can be obtained by switching a light source and controlling the fluorescence-splitting mechanisms according to λ-scanning, even when λ-scanning is performed by using plural types of excitation light.

The embodiments described above give specific examples in order to make the invention easily understandable, and the present invention is not limited to the embodiments described above. Various modifications or variations can be made to the laser microscopes above without departing from the scope of the present invention specified in the claims.

What is claimed is:

1. A laser microscope that disperses and detects fluorescence that is generated by a specimen by irradiating the specimen with excitation light, the laser microscope comprising:
   a fluorescence-splitting mechanism that splits the fluorescence that is generated by the specimen and the excitation light according to a wavelength, the fluorescence-splitting mechanism being configured to change the wavelength according to which the fluorescence-splitting mechanism splits the fluorescence that is generated by the specimen and the excitation light;
   a spectroscopic mechanism that disperses the fluorescence split by the fluorescence-splitting mechanism;
   a detector that detects the fluorescence dispersed by the spectroscopic mechanism;
   a detection wavelength changing mechanism that changes a wavelength of the fluorescence detected by the detector;
   a light source unit configured to selectively output a plurality of beams of excitation light having wavelengths different from each other, with which the specimen is irradiated; and
   a control device that controls the fluorescence-splitting mechanism,
   wherein the control device performs control of the fluorescence-splitting mechanism so as to change the wavelength according to which the fluorescence-splitting mechanism splits the fluorescence that is generated by the specimen and the excitation light output by the light source unit, in accordance with a change in the wavelength of the fluorescence detected by the detector, the change being performed by the detection wavelength changing mechanism.

2. The laser microscope according to claim 1, wherein the detection wavelength changing mechanism changes the wavelength in such a way that the wavelength of the fluorescence detected by the detector is changed from a short-wavelength side to a long-wavelength side.

3. The laser microscope according to claim 1, wherein the fluorescence-splitting mechanism includes a plurality of optical filters that split the fluorescence that is generated by the specimen and the excitation light output by the light source unit at wavelengths different from each other.

4. The laser microscope according to claim 3, wherein each of the plurality of optical filters comprises a long-pass filter.

5. The laser microscope according to claim 3, wherein each of the plurality of optical filters comprises a notch filter.

6. The laser microscope according to claim 1, wherein the fluorescence-splitting mechanism comprises a gradation filter that splits the fluorescence that is generated by the specimen and the excitation light output by the light source unit at different wavelengths according to a position.

7. The laser microscope according to claim 1, wherein the light source unit comprises a plurality of light sources each of which outputs a respective one of the plurality of beams of excitation light having the wavelengths different from each other, and
   wherein the control device performs control of the light source unit so as to turn each of the plurality of light sources to an ON state in an order from a short-wavelength side to a long-wavelength side.

8. The laser microscope according to claim 7, wherein the fluorescence-splitting mechanism includes a plurality of long-pass filters respectively corresponding to the plurality of light sources, each of the long-pass filters splitting light at a wavelength slightly longer than a wavelength of the beam of excitation light output by the light source to which it corresponds.

9. The laser microscope according to claim 8, wherein the control device performs control of the fluorescence-splitting mechanism so as to arrange, on an optical path, a long-pass filter from among the plurality of long-pass filters in an order from a long-pass filter splitting the light at a short wavelength to a long-pass filter splitting the light at a long wavelength.

* * * * *